Figure 1:
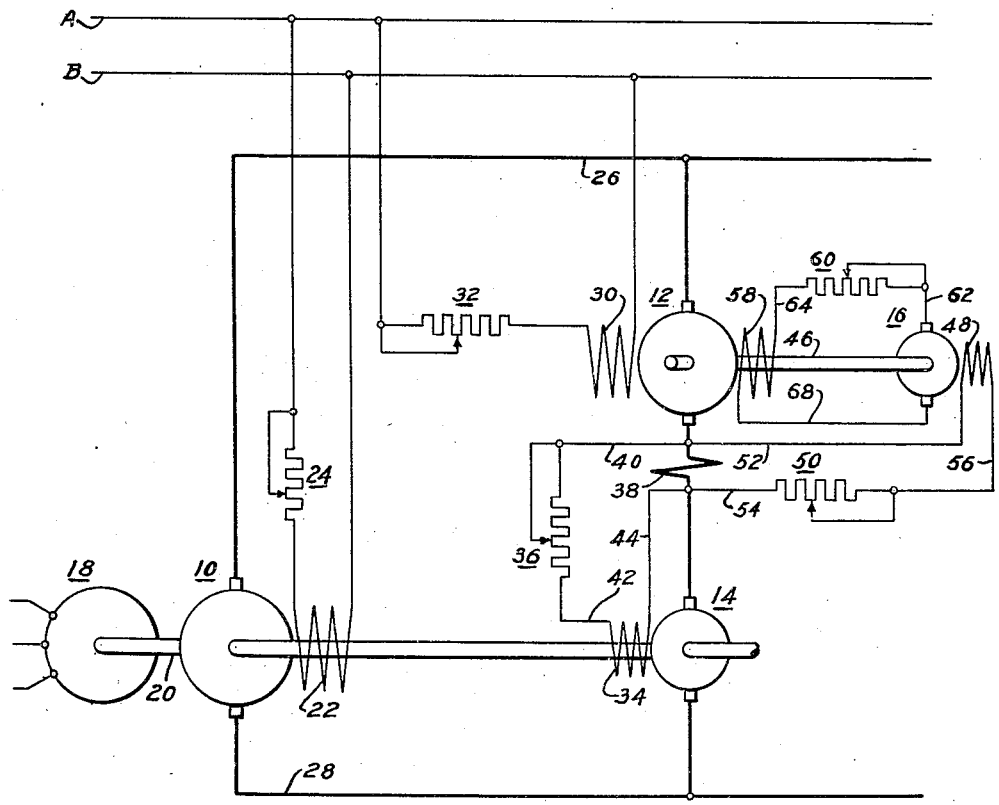

June 17, 1941.  F. R. BURT  2,246,292
CONTROL SYSTEM
Filed April 18, 1939  2 Sheets-Sheet 1

WITNESSES:
N. F. Susser
Joe Weber

INVENTOR
Fred R. Burt.
BY
ATTORNEY

Patented June 17, 1941

2,246,292

UNITED STATES PATENT OFFICE 2,246,292

CONTROL SYSTEM

Fred R. Burt, Murrysville, Pa., assignor to Westinghouse Electric & Manufacturing Company, East Pittsburgh, Pa., a corporation of Pennsylvania Application April 18, 1939, Serial No. 268,513

7 Claims. (Cl. 172—239)

My invention relates, generally, to control systems, and more particularly, to systems for providing the desired speed regulation for direct current motors over a wide speed range.

In certain manufacturing processes it is desirable that drive motors used in the processes have substantially the same regulation throughout a wide speed range. The rolling of steel strip is an example of such a process. In the operation of tandem strip rolling mills, it has been found that considerable strip breakage due to excessive tensions on the strip occurs during the threading, accelerating, and decelerating periods of the mill operation. This breakage is due to failure to maintain the desired speed relations between the roll motors, and this failure is caused by wide variation of the speed regulation of the motors over the range of speeds from the threading speed to the normal running speed.

A direct current motor having flat speed regulation or 2 percent regulation at the speed corresponding to the normal running speed of the mill may have from 20 to 40 percent regulation at the speed corresponding to the threading speed of the mill. This variation of speed regulation with variation of motor speed is due to the fact that the armature IR drop is substantially constant throughout the entire speed range for a given armature current. Thus a given IR drop will be a much greater percentage of the armature potential at the low armature potentials required for low speeds than at the higher armature potentials.

Another factor which influences the speed regulation of the motor is the demagnetizing or field weakening effect of the circulating current flowing in the turns of the armature winding which are short circuited by the brushes while undergoing commutation. This field weakening effect varies almost directly with the motor speed and load except at the lower speeds where its effect is almost negligible. The field weakening effect acts in an opposite manner to that of the armature IR drop upon the motor speed since field weakening tends to increase the motor speed while the armature IR drop tends to decrease the motor speed.

The object of my invention is to provide a control system for a direct current motor which shall function to so compensate for the motor speed influencing factors as to provide a substantially constant speed regulation or to produce any desired variable speed regulation throughout a predetermined speed range of the motor.

Another object of the invention is to provide a control system for direct current motors which shall function to automatically produce any desired motor regulation, which shall be simple and efficient in operation and which shall be inexpensive to manufacture, install and maintain.

Figure 2:
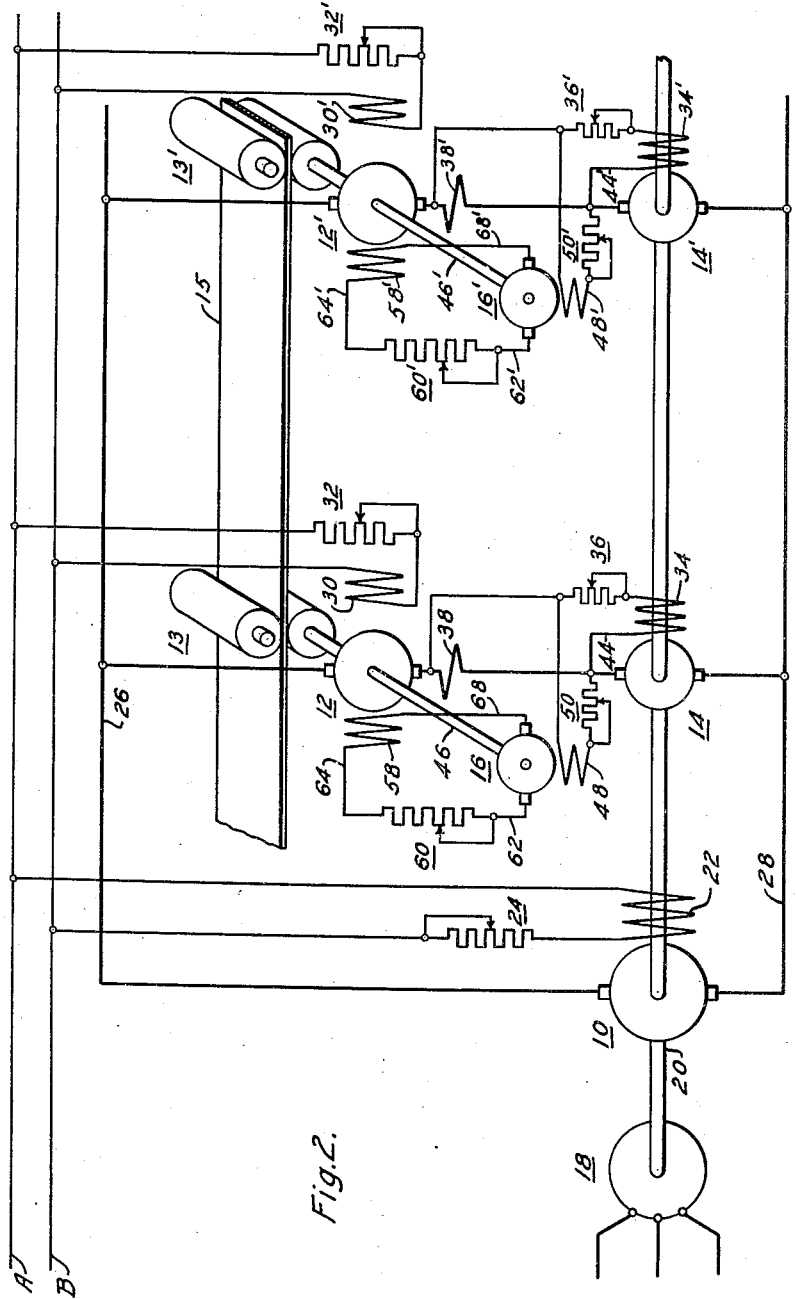

These and other objects and advantages of the invention will be apparent from the following detailed description taken in connection with the accompanying drawings, in which:

Figure 1 is a diagrammatic view of a motor control system embodying the principal features of the invention, and Fig. 2 is a diagrammic view of adjacent roll stands of a strip rolling mill and the drive motors therefor, the drive motors being controlled in accordance with the principles of the invention.

Referring now to Fig. 1 of the drawings, the numeral 12 designates generally a direct-current motor, the speed regulation of which is to be controlled. The motor 12 may be energized from any suitable source of power, such, for example, as the variable-voltage generator 10. A booster generator 14 is connected to provide armature IR drop compensation for the motor by adding to the potential applied to the motor armature, a potential which is proportional to the armature current.

A pilot generator 16 driven by the motor 12 compensates for the demagnetizing effect of the short circuited turns of the armature winding while undergoing commutation by providing an auxiliary excitation for the motor 12 proportional to the motor speed and load.

The generator 10 may be driven by a motor 18 or any other suitable driving means through a shaft 20. The field winding 22 of the generator 10 is connected in series circuit relation with a rheostat 24 to any suitable source of direct current power indicated by the conductors A—B. The conductors 26 and 28 connect the motor 12 for energization by the generator 10 in series circuit with the armature of the booster generator 14. The field winding 30 of the motor 12 is connected in series circuit relation with a rheostat 32 to the conductors A—B.

The booster generator 14 may be continuously driven by the driving motor 18 of the generator 10 and has a field winding 34 connected in series circuit relation with a rheostat 36 to be energized, in accordance with the armature current of the motor 12 in a circuit which extends from one side of the interpole winding 38 of the motor 12 through conductor 40, the rheostat 36, conductor 42, the field winding 34 and conductor 44 to the other side of the interpole winding 38. It is to be understood, that the booster generator 14 may be driven by a separate motor or any suitable source of substantially constant speed power.

The pilot generator 16 may be driven by the motor 12 by connecting it thereto by means of the shaft 46 and has a field winding 48 which is connected in series circuit relation with a rheostat 50 to be energized in accordance with the armature current of the motor 12 in a circuit which extends from one side of the interpole winding 38 through conductor 52, the field winding 48, conductor 54, the rheostat 50 and conductor 56 to the other side of the winding 38.

The motor 12 has an auxiliary field winding 58 which is connected to be energized by the pilot generator 16 in series circuit relation with an adjusting rheostat 60 in a circuit which extends from one side of the pilot generator 16 through conductor 62, the rheostat 60, conductor 64, the field winding 58 and conductor 68 to the other side of the pilot generator 16.

In the operation of the control system the speed of the motor 12 may be varied at will by adjustment of the rheostat 24 providing the desired excitation and output potential of the generator 10. The range of speed of the motor 12 and further speed variations of the motor 12 may be adjusted by operating the field rheostat 32.

Since the speed regulation effect due to the IR drop in the armature of the motor 12 is directly proportional to the armature current of the motor 12, the booster generator 14 will provide an additional potential in series circuit with the armature of the motor 12 to compensate for the IR drop, because the output potential of the booster generator 14 is, as has been pointed out hereinbefore, directly proportional to the armature current of the motor 12. The rheostat 36 may be adjusted to provide the proper energization of the field winding 34 to make the output potential of the booster generator 14 equal to the IR drop in the armature of the motor 12 for all load conditions of the motor.

The speed regulating effect of the field weakening due to short circuiting armature coils undergoing commutation is proportional to the speed of the motor and the motor load or armature current. The pilot generator 16 being driven by the motor 12 and having an excitation proportional to the armature current of the motor 12 will have an output potential proportional to the speed of the motor 12 and the load on the motor 12 and by proper adjustment of the rheostats 50 and 60 this output potential may be made to so energize the field winding 58 of the motor 12 as to cause a field strengthening of the motor 12 equal to the field weakening due to the short-circuited armature coils undergoing commutation.

Thus, it will be seen that the booster generator 14 and the pilot generator 16 will function to compensate for the IR drop and field weakening regulation effect throughout the entire range of motor speed variation and load variation.

This motor control system is particularly useful in steel strip rolling mills where the system may be applied to each of the mill motors and the reel motors, as described in the copending application of W. G. Cook for a Control system, filed April 25, 1939, Serial No. 269,908, having a common assignee with this application, to maintain the desired speed relations between the motors at the threading and rolling speeds and to maintain the desired regulation of the motors to prevent undue stresses upon the strip as it is threaded through the mill and while the mill is accelerating.

The manner in which the control system is applied to tandem mills is shown in Fig. 2 of the drawings, in which the control system of Fig. 1 is applied to the drive motors of adjacent roll stands of a strip rolling mill, identical and similar reference characters in the two figures of the drawings designating similar elements of the control system.

The mill motors 12 and 12' drive the adjacent roll stands 13 and 13' of a strip rolling mill through which a strip 15 passes. The control systems for the mill motors 12 and 12' are identical with the system described in connection with Fig. 1 of the drawings, the motors 12 and 12' being connected in parallel circuit relation and energized by the generator 10.

While the system has been described as operating to provide substantially constant flat regulation, it is to be understood that any type of regulation may be provided by the proper adjustment of the various instrumentalities of the system. For example, if it is desired to provide flat regulation at normal mill speed and 10 percent droop at 10 percent of normal mill speed, or if it is desired to provide any definite percent regulation other than flat regulation throughout the entire speed range, the system may be adjusted by means of the rheostats 36, 50 and 60 to provide the proper booster generator and pilot generator compensating potentials to produce the desired regulation.

Thus it will be seen that I have provided a control system for electric motors which shall function to provide any desired regulation throughout the entire motor speed range which shall be simple and efficient in operation and inexpensive to manufacture, install and maintain.

In compliance with the requirements of the patent statutes, I have shown and described herein the preferred embodiment of my invention. It is to be understood, however, that the invention is not limited to the precise construction shown and described but is capable of modification by one skilled in the art, the embodiment herein shown being merely illustrative of the principles of my invention.

I claim as my invention:

1. In a control system for an electric motor, means applying a main energizing potential to the motor armature, means applying an auxiliary energizing potential to the motor armature proportional to the motor armature current and in the direction of the main energizing potential, means applying a main excitation to the motor, and means applying an auxiliary excitation to the motor to reinforce the main excitation and proportional to the speed of the motor and the motor armature current.

2. In a control system for an electric motor, means applying a main energizing potential to the motor armature, means applying an auxiliary energizing potential to the motor armature proportional to the motor armature current and in the direction of the main energizing potential, means applying a main excitation to the motor, means applying an auxiliary excitation to the motor to reinforce the main excitation, a generator driven by the motor and connected to energize said auxiliary excitation means, and means exciting said generator in accordance with the motor armature current.

3. In a control system for an electric motor, means applying a main energizing potential to the motor armature, means applying an auxiliary energizing potential to the motor in the direction of the main energizing potential and proportional to the motor armature current, means applying a main excitation to the motor, an auxiliary field winding for the motor, a generator connected to energize said auxiliary field winding in aiding relation with the main excitation, and means for varying the output potential of said generator in accordance with the motor speed and the motor armature current.

4. In a control system for a plurality of motors, means applying a common energizing potential to the armatures of said motors in parallel circuit relation, means for varying said energizing potential to thereby simultaneously vary the speed of the motors, means applying an auxiliary energizing potential to each of the motor armatures in the direction of the energizing potential and proportional to the respective armature currents of the motors, means applying a main excitation to each of the motors, and means applying an auxiliary excitation to each of the motors in aiding relation with the main excitation proportional to the respective speeds and armature currents of the motors.

5. In a control system for a plurality of associated motors, means applying a common energizing potential to the armatures of the motors connected in parallel circuit relation, means for varying said energizing potential to thereby simultaneously vary the speed of the motors, means applying an auxiliary energizing potential to each of the motors proportional to the respective armature currents of the motors and in the direction of the common energizing potential, means applying a main excitation to each of the motors, an auxiliary field winding for each of the motors connected in aiding relation with the main excitation, a generator driven by each of the motors and connected to energize said auxiliary field winding of each associated motor, and means exciting each of said generators in accordance with the armature current of its driving motor.

6. In a control system for the drive motors for the rolls and reels of a strip rolling mill, means applying a common energizing potential to the armatures of the motors connected in parallel circuit relation, means for varying said energizing potential to thereby simultaneously vary the speed of the motors, means applying an auxiliary energizing potential to each of the motors in the direction of the common energizing potential and proportional to the respective armature currents of the motors, means applying a main excitation to each of the motors, an auxiliary field winding for each of the motors connected in aiding relation with the main excitation, a generator associated with each of said auxiliary field windings to provide energization therefor, and means for varying the output potential of each of said generators in accordance with the speed and armature current of the motor whose auxiliary field winding it energizes.

7. In a control system for a motor whose armature is connected to a source of power, a continuously driven generator connected in series circuit relation with the motor armature and connected so that its output potential is in aiding relation with the source of power, means exciting the said generator in accordance with the motor armature current, an auxiliary generator driven by the motor, means exciting said auxiliary generator in accordance with the motor armature current, a main field winding for the motor, and an auxiliary field winding for the motor energized by said auxiliary generator and connected to excite the motor in aiding relation with the main field winding of the motor.

FRED R. BURT.